(12) United States Patent
Li et al.

(10) Patent No.: US 11,517,037 B2
(45) Date of Patent: Dec. 6, 2022

(54) INTELLIGENT APPARATUS FOR SEPARATING WALNUT KERNELS AND RED COATS BY BELT CONVEYING AND HEAT RADIATION BASED ON THERMAL EXPANSION AND CONTRACTION PRINCIPLE

(71) Applicants: QINGDAO UNIVERSITY OF TECHNOLOGY, Qingdao (CN); XINJIANG JIANGNING LIGHT INDUSTRY MACHINERY ENGINEERING TECHNOLOGY CO., LTD, Urumqi (CN)

(72) Inventors: Changhe Li, Qingdao (CN); Mingzheng Liu, Qingdao (CN); Ji Che, Urumqi (CN); Sanqiang Zhang, Qingdao (CN); Yanbin Zhang, Qingdao (CN); Dongzhou Jia, Qingdao (CN); Cai Wang, Urumqi (CN); Weidong Xie, Qingdao (CN); Qianqian Zhao, Qingdao (CN); Mingchuang Kang, Qingdao (CN); Enhao Liu, Qingdao (CN); Zhaohua Li, Qingdao (CN); Yali Hou, Qingdao (CN)

(73) Assignees: QINGDAO UNIVERSITY OF TECHNOLOGY, Qingdao (CN); XINJIANG JIANGNING LIGHT INDUSTRY MACHINERY ENGINEERING TECHNOLOGY CO., LTD, Urumqi (CN)

( * ) Notice: Subject to any disclaimer, the term of this patent is extended or adjusted under 35 U.S.C. 154(b) by 426 days.

(21) Appl. No.: 16/725,994

(22) Filed: Dec. 23, 2019

(65) Prior Publication Data

US 2020/0128866 A1 Apr. 30, 2020

Related U.S. Application Data

(63) Continuation of application No. PCT/CN2018/119449, filed on Dec. 6, 2018.

(30) Foreign Application Priority Data

Feb. 11, 2018 (CN) .......................... 201810141173.3

(51) Int. Cl.
*A23N 5/00* (2006.01)
*B65G 47/16* (2006.01)

(52) U.S. Cl.
CPC ............. *A23N 5/002* (2013.01); *B65G 47/16* (2013.01); *B65G 2201/0202* (2013.01)

(58) Field of Classification Search
CPC ........... A23N 5/00; A23N 5/002; B65G 47/16
(Continued)

(56) References Cited

U.S. PATENT DOCUMENTS 1,434,815 A * 11/1922 Greene .................. A23N 5/002
426/523
1,448,431 A * 3/1923 Castruccio .............. A23L 25/20
426/632

(Continued)

FOREIGN PATENT DOCUMENTS

CN 1579558 A 2/2005
CN 103251114 A 8/2013
(Continued)

OTHER PUBLICATIONS

Internationl Search Report of PCT/CN2018/119449, dated Mar. 13, 2019.

*Primary Examiner* — Douglas A Hess
(74) *Attorney, Agent, or Firm* — True Shepherd LLC; Andrew C. Cheng

(57) ABSTRACT

Disclosed is a continuous feeding mechanism including a transfer mechanism, wherein the transfer mechanism
(Continued)

includes a rotatable indent roller circumferentially provided with a plurality of blanking grooves; a post pin is arranged in each blanking groove; the post pin is connected with a spring; the spring is arranged towards the interior of the indent roller; and the post pin can move along the blanking grooves; a feeding box, wherein the bottom of the feeding box is hollow, and the bottom is arranged above the indent roller or the bottom is fixedly connected with the indent roller; the continuous feeding mechanism is arranged above one side of the transfer mechanism; and an electromagnetic heating mechanism which includes a supporting frame, wherein the transfer mechanism is arranged in the supporting frame, and an electromagnetic coil is circumferentially arranged outside the supporting frame.

7 Claims, 6 Drawing Sheets

(58) Field of Classification Search
USPC .......................................................... 99/466
See application file for complete search history.

(56) References Cited

U.S. PATENT DOCUMENTS

| | | | | |
|---|---|---|---|---|
| 3,808,964 A * | 5/1974 | Barnes, Jr | ............ | A23N 5/002 99/518 |
| 4,353,931 A * | 10/1982 | Volk, Sr. | ................. | A23N 5/00 99/574 |
| 4,537,122 A * | 8/1985 | George | .................. | A23N 5/002 99/584 |
| 4,595,595 A * | 6/1986 | Gunnerson | ............. | A23L 25/20 426/469 |
| 4,959,236 A * | 9/1990 | Gunnerson | ............ | A23N 5/002 426/482 |
| 9,113,656 B2 * | 8/2015 | Roig Borrell | .......... | A23N 5/008 |
| 9,510,704 B2 | 12/2016 | Haimoff et al. | | |
| 11,013,252 B2 * | 5/2021 | Borrell | .................... | A23N 5/008 |
| 2009/0068332 A1 | 3/2009 | Idowu | | |
| 2016/0286848 A1 | 10/2016 | Borrell | | |

FOREIGN PATENT DOCUMENTS

| | | |
|---|---|---|
| CN | 103504450 A | 1/2014 |
| CN | 107594551 A | 1/2018 |
| CN | 108185450 A | 6/2018 |

* cited by examiner

Section B-B

A-A

INTELLIGENT APPARATUS FOR SEPARATING WALNUT KERNELS AND RED COATS BY BELT CONVEYING AND HEAT RADIATION BASED ON THERMAL EXPANSION AND CONTRACTION PRINCIPLE

CROSS-REFERENCE TO RELATED APPLICATIONS

This application is a continuation of International Patent Application No. PCT/CN2018/119449 with a filing date of Dec. 6, 2018, designating the United States, now pending, and further claims priority to Chinese Patent Application No. 201810141173.3 with a filing date of Feb. 11, 2018. The content of the aforementioned applications, including any intervening amendments thereto, are incorporated herein by reference.

TECHNICAL FIELD

The present invention relates to a short-time heating and red coat removal system of a walnut kernel, and particularly relates to an intelligent apparatus for separating walnut kernels and red coats by belt conveying and heat radiation based on a thermal expansion and contraction principle.

BACKGROUND OF THE PRESENT INVENTION

Along with the rapid development of the society, people's living standard has been improved continuously, and people's demands on the healthy edible oil are increased. Therefore, many oil production enterprises begin to produce the walnut oil rich in unsaturated fatty acids. However, the red seed coats of the walnut kernels, commonly known as red coats, have a great influence on the quality of the walnut oil. In order to obtain high-quality walnut oil, the red coats on the surfaces of the walnut kernels must be removed firstly. At present, a majority of walnut oil production enterprises adopt a hot alkaline immersion method or a boiling water braising method to achieve the purpose. However, both the hot alkaline immersion and the boiling water braising have certain influence on the quality of the walnut kernels, and the subsequent treatment process is complicated, which will be described below in detail. Therefore, on the premise of not damaging the quality of the walnut kernels, the red coats of the walnut kernels are removed by using a physical method, which can effectively improve the production efficiency, and can meet the market demands. At present, there is no intelligent device in the market for removing the red coats of the walnut kernels by using the physical method. Therefore, by drawing lessons from methods for removing the seed coats of other nuts by heating and improving the methods, a continuous feeding and electromagnetic heating intelligent device for removing the red coats of the walnut kernels has been developed.

After searching, an alkaline liquor immersion method invented by Zhao Xizhou (Patent No.: CN204707949U) is to remove the red coats of the walnut kernels through the alkaline liquor immersion method. The alkaline liquor immersion method is mainly a chemical method using the dilute alkaline liquor of a given concentration to immerse the walnut kernels for a period of time under certain temperature and dissolve pectin substances of the seed coats and walnut kernels so as to remove the red coats. The method is high in efficiency, but has the following disadvantages: firstly, after the red coats are removed, the walnut kernels shall be rinsed with clean water to prevent the residue of alkaline liquor, which leads to complicated subsequent treatment process; secondly, the alkaline liquor may dissolve grease and proteins in the walnut kernels, which may reduce the quality of the walnut kernels; thirdly, excessively high or excessively low temperature may reduce the removal rate of the red coats, and the temperature of the alkaline liquor is difficult to automatically control; and finally, if the rinsing link is not well controlled, the alkaline liquor may remain, which influences the quality of the oil and the health of human bodies. Therefore, the coat removal method has great defects and cannot efficiently produce the high-quality walnut kernels.

After searching, Yang Weiming invented a heating roller apparatus for baking Chinese torreya (Patent No.: 201420222962.7). The heating roller apparatus includes a main shaft, a support rack, a circular cylinder with one opened side, a heating resistance wire and an oven door. The main shaft is driven by a motor; the circular cylinder is fixedly connected with the main shaft; the axis of the main shaft is overlapped with the axis of the circular cylinder; and the support rack is located between the main shaft and the circular cylinder and plays a role in supporting the circular cylinder. The outer wall of the circular cylinder is provided with annular wavy grains, so that the heating resistance wire is uniformly wound on the outer wall of the circular cylinder. The oven door is installed at an opening of the circular cylinder, and materials are fed from the oven door. When in heating, the oven door is closed. The heating apparatus is simple, can uniformly heat the materials, but also has many disadvantages: firstly, since no thermal insulation apparatus is arranged outside the resistance wire, the heat loss is great; secondly, the main shaft is relatively long; if there are too many materials, the requirements for the rigidness of the main shaft are relatively high; and finally, the heating apparatus has no continuity and is relatively low in efficiency. Therefore, the apparatus is not applicable.

After searching, Chen Zhang invented a heating roller apparatus for stir-frying chilies (Patent No.: 201620051206.1), and a working process thereof may be generally divided into three steps: feeding, stir frying and impurity separation, and discharging. The heating roller apparatus for stir-frying the chilies generally includes a material inlet, a material outlet, an impurity discharging opening, a separation fan and a heating roller with inner threads. The feeding step is that through the forward rotation of the inner threads of the heating roller, a spiral thrusting force generated in the roller screws the materials into the roller. In a similar principle, when in discharging, the heating roller rotates backwards, and the inner threads screw out the materials. The stir frying and the separation of the materials are implemented by virtue of the joint effect of the inner threads and the separation fan. The inner threads can stir fry and raise the materials, and at the same time, the pressure air produced by the separation fan blows away impurities in the materials. Some tiny impurities may be separated through pores on the wall of the roller, while the large granular impurities are discharged and collected through the impurity discharging opening under the driving of the spiral rotation. Meanwhile, steam generated when the chilies are stir-fried can be discharged through air vents on the roller. Although the apparatus is provided with a thermal insulation layer on the outer side to improve the utilization rate of the heat, the material outlet and the impurity discharging opening are communicated with the outside, so that the thermal insulation effect of the apparatus is greatly reduced. The inner-thread roller used in the apparatus may cause the pileup of the materials at a baffle plate when stir frying the materials. If the stir-fried object is the walnut kernels with soft texture, the walnut kernels may be pressed and damaged, resulting in non-uniformity in heating of the walnut kernels and reduction of the red coat removal efficiency. Therefore, the apparatus cannot be directly used to heat the walnut kernels.

After searching, a blanching method is also a conventional walnut kernel red coat removal method. The principle used in the blanching method is very simple and is mainly to change the water content of the walnut kernels and the red coats through the boiling water immersion or braising method, so that the walnut kernels and the red coats are easier to separate and strip. However, the method also has the same problem with that of the alkaline liquor immersion. The boiling water immersion and braising time shall be increased while the removal efficiency of the red coats of the walnut kernels is ensured. However, with the increase of the time, the water content in the walnut kernels may also be increased, and the high temperature may also deteriorate the proteins in the walnut kernels, thereby changing the ingredients and quality of the walnut kernels. By analyzing the test data, while the removal efficiency of the red coats of the walnut kernels is ensured, the best boiling water immersion time and braising time are respectively 6 min and 5 min. However, even under the best immersion time and best immersion temperature, by using the method, the later processability of the walnut kernels may also be reduced through the method of changing the water content of the walnut kernels. The method is not high in red coat removal efficiency. For the walnut kernels having grooves on the surfaces, the manual cleaning is still required in the later period, which greatly reduces the coat removal efficiency of the walnut kernels and the automation degree of the device. Similarly, the high temperature of the boiling water may change the quality of the proteins in the walnut kernels. The increase of the water content may also cause softer texture of the walnut kernels, which greatly increases the damage probability of the walnut kernels during the secondary processing, limits the processing range of the walnut kernels, and is not conducive to the deep processing of the walnut kernels and guarantee of the walnut kernel quality.

In conclusion, the alkaline liquor in the alkaline liquor immersion method may dissolve partial proteins and grease in the walnut kernels, and reduce the quality of the walnut kernels. The residues of alkaline liquor may cause certain harm to the human bodies, so that the edible safety coefficient of the processed walnut kernels may be greatly reduced. The high temperature in the immersion method may damage partial proteins in the walnut kernels, and the immersion method may also increase the water content in the walnut kernels, which greatly influences the secondary processing of the walnut kernels, and reduces the quality of the walnut kernels. The stir-frying and heating apparatuses for baking the Chinese torreya and stir-frying the chilies also have a series of problems that the materials are not uniform in stir frying and heating, the stir-frying efficiency is low, the stir-frying apparatus is complicated and time-consuming in feeding and discharging the materials, the effect for separating the materials and impurities is poor and the secondary damage is caused by the pileup of the materials. For the walnut kernels with soft texture, if the walnut kernels are directly processed simply according to the principle of the existing nut heating stir-frying apparatus, the quality of the walnut kernels is undoubtedly irrevocably damaged. Therefore, the direct use of the above stir-frying and heating apparatus is infeasible.

SUMMARY OF PRESENT INVENTION

In order to overcome the defects of the prior art, the present invention provides an intelligent apparatus for separating walnut kernels and red coats by belt conveying and heat radiation based on a thermal expansion and contraction principle, which separates a radiation heating mechanism from a red coat removal mechanism. Firstly, by using the difference in the thermal expansion coefficients of the walnut kernels and the red coats, the red coats are primarily separated from the walnut kernels through the electromagnetic heating. The present invention solves the problems that the walnut kernels are easy to damage, the walnut kernels are unevenly heated, and the red coat removal efficiency is low.

The specific solution of the intelligent apparatus for separating walnut kernels and red coats by belt conveying and heat radiation based on the thermal expansion and contraction principle is as follows:

The intelligent apparatus for separating walnut kernels and red coats by belt conveying and heat radiation based on the thermal expansion and contraction principle includes:

an electromagnetic heating mechanism including a supporting frame, wherein a transfer mechanism is arranged in the supporting frame, and an electromagnetic coil is circumferentially arranged outside the supporting frame; and the transfer mechanism penetrating through the supporting frame and used to feed walnut kernels into the supporting frame and transfer the walnut kernels out of the electromagnetic heating mechanism.

Further, one side of the transfer mechanism is also provided with a feeding mechanism.

Further, the feeding mechanism includes a feeding plate obliquely arranged; a middle portion of the feeding plate is provided with a rotating shaft with a material shifting groove; the rotating shaft is connected with a grooved pulley component disposed on a side portion of the feeding plate; and a lower half section of the feeding plate is provided with a plurality of distributing plates.

Or, the distributing plates are arranged along a length direction of the feeding plate, and a longitudinal section of each distributing plate is of a herringbone structure; and the rotating shaft is arranged in a width direction of the feeding plate.

In another embodiment of the present invention, the electromagnetic heating mechanism can be replaced by a resistance heating mechanism or other heating mechanisms.

The longitudinal section of the supporting frame is annular. Both sides of the supporting frame are supported respectively through the supporting plate. A radiation liner is arranged in the supporting frame. A thermal insulation layer is arranged between the radiation liner and the electromagnetic coil. The thermal insulation layer is arranged to keep the temperature of the liner, and the thermal insulation layer can also protect the electromagnetic coil against the influence of a radiation source. The electromagnetic coil does not generate heat, so that the service life of the coil is greatly prolonged, and the stability and the accuracy of the heating power can be ensured.

Further, the outer side of the electromagnetic coil is provided with a thermal insulation shell.

Further, a temperature sensor is arranged in the radiation liner. The temperature sensor is connected with a controller.

The controller is separately connected with a control switch of the electromagnetic coil and the transfer mechanism. The temperature sensor monitors the heating temperature in real time, and adjusts the transportation speed of the transfer mechanism to control the heating time, so as to control the transmission speed of the transfer mechanism and the heating temperature of the electromagnetic heating mechanism to be changed in a set proportion to realize the heating uniformity of the walnut kernels.

Or, the longitudinal section of the radiation liner is arranged in a rectangular ring to facilitate the passing of the transfer mechanism.

Further, the transfer mechanism is a conveyor belt. In order to prevent an alternating magnetic field generated by the electromagnetic coil from turning the conveyor belt into a new radiation source and making the walnut kernels cling to the surface of a crawler belt and excessively heated, the conveyor belt is made of high temperature resistant material with poor magnetic conductivity (such as zirconia ceramics, stainless steel, molybdenum, titanium, etc.) and adopts a netted structure, so that when the conveyor belt is disposed in the magnetic field, the conveyor belt may not generate heat directly due to the electromagnetic induction. The conveyor belt is supported through transfer rolls arranged on an upper support rack and a lower support rack. The transfer rolls are driven by a belt transfer component to rotate. The upper support rack and the lower support rack are supported through a plurality of connecting rods. The supporting frame is arranged around the upper support rack.

Further, the feeding mechanism includes a rotatable indent roller and is circumferentially provided with a plurality of blanking grooves. A post pin is arranged in each blanking groove. A pushing unit element capable of contacting the post pin is arranged in the indent roller. The pushing unit element can push the post pin to move along the blanking grooves, i.e. to move in a reciprocating manner along the radial direction of the indent roller.

Further, the pushing unit element includes an adjusting rotating shaft arranged in the indent roller and coaxial with the indent roller. The adjusting rotating shaft is circumferentially provided with an eccentric sleeve. The periphery of the adjusting rotating shaft is provided with a positioning shaft sleeve with a slide block. The slide block contacts the eccentric sleeve. In a normal state, the slide block can contact a spring. The spring is connected with the post pin. The indent roller rotates to drive the post pin and the spring to rotate around the positioning shaft sleeve. When the post pin rotates for a set angle, the spring contacts the slide block, and the slide block pushes out the post pin with the spring, so that the materials in the blanking grooves are pushed out.

Or, the top of the indent roller is provided with a feeding box. The bottom of the feeding box is hollow, and the bottom is arranged above the indent roller or the bottom is fixedly connected with the indent roller.

According to the red coat removal apparatus, the material can be uniformly discharged through the rotation of the indent roller at constant speed, so that the materials can be uniformly fed to the transfer mechanism. The position of the slide block is changed by driving the eccentric sleeve through the rotation of the adjusting rotating shaft to adjust a variable volume of the blanking groove and to adjust a spray amount of the material at each time, thereby adjusting the feeding speed of the materials. The feeding speed of the materials can also be adjusted by adjusting the rotating speed of the indent roller. The AC current is used to generate an alternating magnetic field to make the radiation liner generate heat under the action of the alternating magnetic field to become a heat radiation source, so that the radiation heating can be carried out for the walnut kernels of the transfer mechanism. The controllability of the heating temperature and the heating uniformity of the walnut kernels on the transfer mechanism can be realized.

In addition, the electromagnetically heated walnut kernels are basically separated from the red coats, so as to set a foundation for the next fundamental separation. The intelligent apparatus for separating the walnut kernels and red coats by belt conveying and heat radiation based on the thermal expansion and contraction principle utilizes the difference in the heat expansion coefficients of the walnut kernels and red coats, and utilizes the heating apparatus to heat the walnut kernels in a given temperature range to separate the walnut kernels from the red coats. The heating mechanism may use various heating modes. The electromagnetic heating mode is shown in the present apparatus, and on the basis of changing partial mechanisms, other heating modes such as resistance heating mode may also be used.

The present invention provides a continuous feeding mechanism. The mechanism can realize the continuous loading of the materials, can ensure the uniformity, and can adjust the quantity of the materials.

A continuous feeding mechanism includes:

a rotatable indent roller which is circumferentially provided with a plurality of blanking grooves; each blanking groove is provided with a post pin therein; the post pin is connected with a spring; the spring is arranged towards the interior of the indent roller; and the post pin can move along the blanking grooves;

a feeding box, wherein the bottom is hollow, and the bottom is arranged above the indent roller or the bottom is fixedly connected with the indent roller;

a positioning shaft sleeve arranged in the indent roller and provided with a slide block; and an adjusting rotating shaft which is circumferentially provided with an eccentric sleeve and arranged in the positioning shaft sleeve. The slide block contacts the eccentric sleeve. In a normal state, the slide block can contact the spring. The indent roller rotates to drive the post pin and the spring to rotate around the positioning shaft sleeve. When the post pin rotates for a set angle, the spring contacts the slide block, and the slide block pushes out the post pin with the spring, so that the materials in the blanking groove are pushed out.

By arranging the above mechanism, the walnut kernels can be uniformly and densely transferred to the transfer mechanism. The walnut kernels are densely and uniformly distributed on the heating transfer mechanism, so that the walnut kernels can be uniformly heated by the heating apparatus, and the processing efficiency of the heating mechanism for the walnut kernels can be improved.

Further, when the slide block does not contact the spring, the end portion of the spring is abutted against the positioning shaft sleeve.

Further, the end portion, contacting the slide block, of the spring can be in an arc shape, and the blanking grooves are uniformly arranged in the indent roller.

Further, the side portion of the indent roller is provided with a seed protection plate. The seed protection plate is arranged in an arc shape to prevent impurities from entering the blanking grooves.

Compared with the prior art, the present invention has the following beneficial effects:

(1) The present invention has the advantages of uniformity in heating, good thermal insulation effect, high automation degree, high coat removal efficiency, etc. In the heating process of the walnut kernels, the water in the walnut kernels can be dissipated in time, so that the water content of the walnut kernels can be effectively reduced, and the flavor of the walnut kernels can be effectively improved.

(2) The electromagnetic coil is uniformly wound on the supporting frame, and by using the electromagnetic heating, the radiation liner generates eddy current and becomes a radiation source. Compared with the resistance wire heating, more uniformity can be achieved, the energy consumption is small, and the damage is unlikely to occur. Moreover, compared with the resistance wire heating, the heating efficiency is high, the heat is unlikely to lose, and the electromagnetic coil does not generate heat, so that the loss of the coil is reduced.

(3) By adopting the conveyor belt transfer mechanism, the walnut kernels can be continuously conveyed into the heating mechanism, so that the production efficiency of the device and the automation degree of the apparatus can be improved, and a series of problems caused by the intermittent stir frying of the traditional nut stir-frying and heating mechanism can be avoided. The conveyor belt and the electromagnetic heating mechanism are made into an integrated mechanism through the outer supporting plate, so that the stability of the conveyor belt when entering and exiting the heating mechanism and the heating uniformity of the walnut kernels when passing through the heating apparatus can be ensured.

(4) By arranging the temperature sensor, the temperature of the radiation liner, heated air contacting the walnut kernels and the surface of a conveyor belt can be monitored in real time, and the temperature is fed back to an external circuit system to adjust the transport speed of the conveyor belt to ensure the reasonable time of the walnut kernels in the appropriate temperature state, thereby improving the intelligence of the overall system.

(5) The conveyor belt is made of the stainless steel material with poor magnetic conductivity, so that the heating problem of a transport crawler belt located in the alternating magnetic field is effectively reduced, and the influence of other heat sources on the heating uniformity of the walnut kernels can be reduced.

(6) By adopting the indent roller structure, the materials can be uniformly and stably sprayed onto the conveyor belt, and the adjustable indent roller structure may also adjust the discharging speed of the materials to facilitate the uniformity in heating the walnut kernels in following steps.

DESCRIPTION OF THE DRAWINGS

The drawings of description constituting part of the present application are used to provide further understanding of the present application. The exemplary embodiments and description thereof of the present application are used to explain the present application and do not constitute the improper limitation to the present application.

FIG. 3(*b*) is a sectional view of an electromagnetic heating square tube;

FIG. 4(*b*) is a left view of a transmission apparatus:

FIG. 4(*c*) is a top view of a transmission apparatus;

FIG. 5(*b*) is a sectional view of a continuous feeding mechanism;

FIG. 5(*c*) is an isometric diagram of a continuous feeding mechanism pulley.

Figure 1:
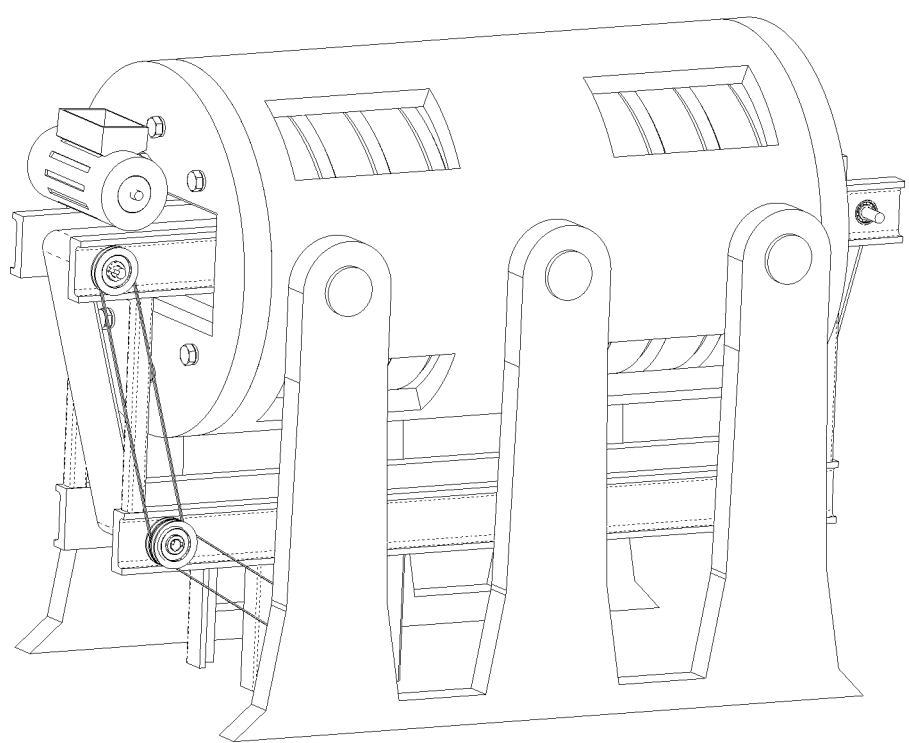
FIG. 1 is an isometric diagram of an intelligent apparatus for separating walnut kernels and red coats by belt conveying and heat radiation based on a thermal expansion and contraction principle (an overall isometric diagram of the apparatus)

In the figures: I-01—thermal insulation shell, I-02—electromagnetic coil, I-03—thermal insulation layer, I-04—right end cover, I-05—washer, I-06—bolt, I-07—radiation liner, I-08—supporting plate 1, I-09—left end cover, I-10—supporting plate 2, I-11—temperature sensor II-01—stepper motor, II-02—key 1, II-03—key 2, II-04—key 3, II-05—key 4, II-06—transmission belt 1, II-07—transmission belt 2, II-08—belt pulley 1, II-09—belt pulley 2, II-10—belt pulley 3, II-11—belt pulley 4, II-12—transfer shaft 1, II-13—transfer shaft 2, II-14—supporting shaft 1, II-15—supporting shaft 2, II-16—supporting shaft 3, II-17—transfer bearing, II-18—supporting bearing, II-19—conveyor belt, II-20—supporting angle steel, and II-21—supporting I-shaped steel.

III-01—seed protection plate, III-02—indent roller, III-03—slide block, III-04—post pin, III-05—positioning shaft sleeve, III-06—spring, III-07—eccentric sleeve, III-08—adjusting rotating shaft, III-09—key, III-10—feeding box, III-11—feeding plate, III-12—rotating plate, III-13—distributing plate, III-14—grooved pulley, and III-15—grooved pulley core.

DETAILED DESCRIPTION OF PREFERRED EMBODIMENTS

It should be noted that the following detailed description is exemplary and is intended to provide further illustration to the present application. Unless otherwise specified, all technical and scientific terms used herein have the same meanings as generally understood by ordinary skilled in the prior art to which the present invention belongs.

It should be noted that the terms used herein are for the purpose of describing specific embodiments only and are not intended to limit exemplary implementation modes according to the present invention. As used herein, the singular form is also intended to include the plural form unless otherwise clearly indicated by the context. In addition, it should be understood that when the terms "contain" and/or "include" are used in the specification, the terms specify the presence of features, steps, operations, devices, components, and/or combinations thereof.

As described in the background, the prior art has defects. In order to solve the above technical problems, the present application is proposed.

In a typical implementation mode of the present application, as shown in FIG. 1, an intelligent apparatus for separating walnut kernels and red coats by belt conveying and heat radiation based on a thermal expansion and contraction principle includes three portions: an electromagnetic heating mechanism I, a transfer mechanism II aid a continuous feeding mechanism III (briefly called a dispersion mechanism).

Figure 2:
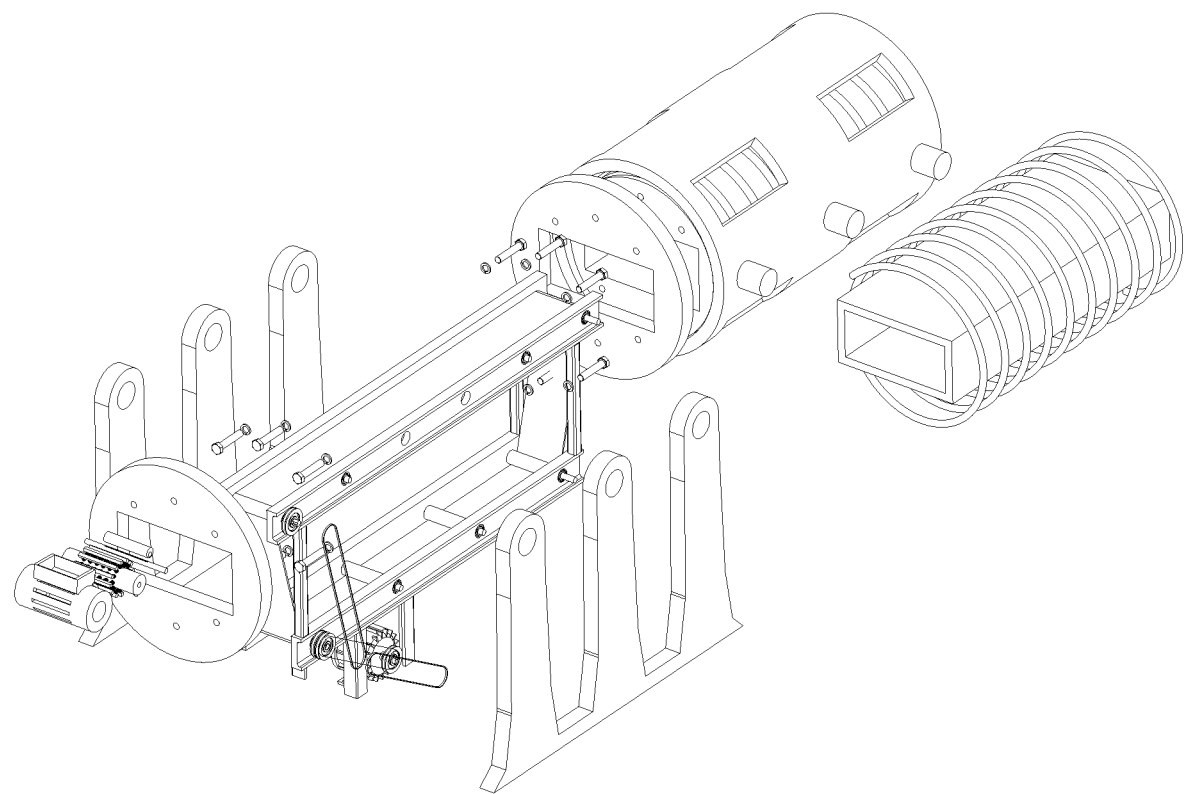
FIG. 2 is an exploded view of an intelligent apparatus for separating walnut kernels and red coats by belt conveying and heat radiation based on a thermal expansion and contraction principle.

As shown in FIG. 2, FIG. 2 is an exploded view of the intelligent apparatus for separating walnut kernels and red coats by belt conveying and heat radiation based on the thermal expansion and contraction principle, and all components are shown in the figures.

Figure 3A:
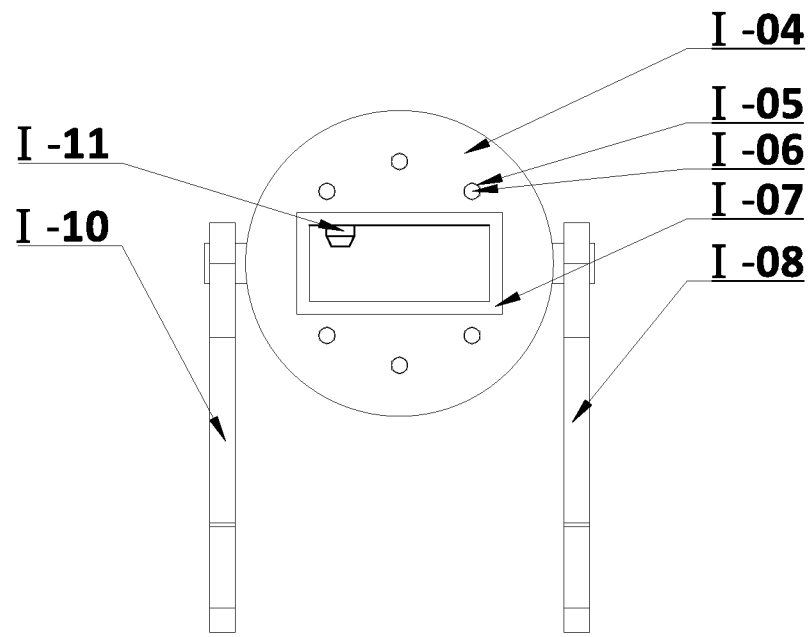
FIG. 3(*a*) is a left view of an electromagnetic heating square tube.
Figure 3B:
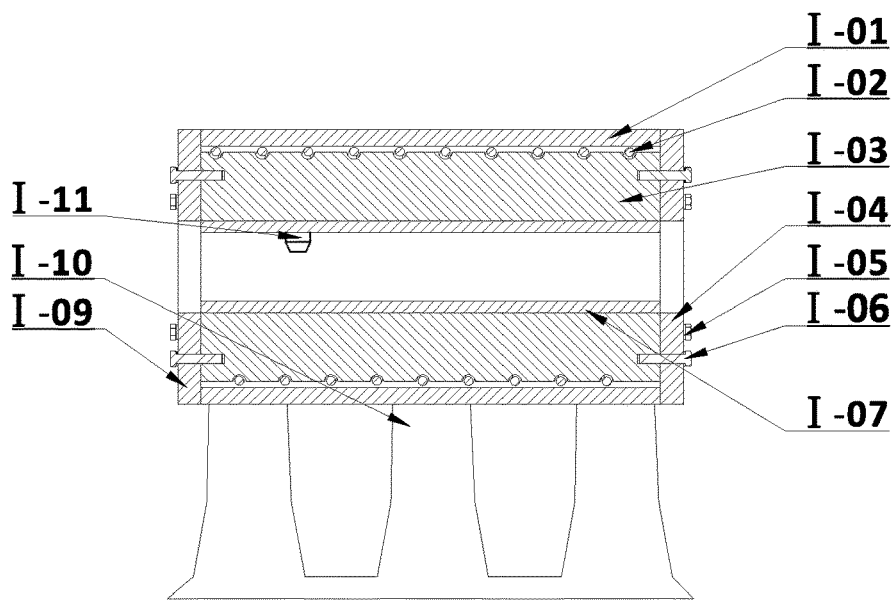

As shown in FIG. 3(a) and FIG. 3(b), a left end cover I-09 and a right end cover I-04 are fixed on both ends of a supporting frame through a bolt I-06 and a washer I-05 to perform certain thermal insulation effect. The outer side of the supporting frame is provided with a thermal insulation shell I-01. The left end cover I-09 and the right end cover I-04 are respectively provided with a rectangular opening for facilitating the transportation of materials. A radiation liner I-07 is rectangular and is sleeved in a cylindrical thermal insulation layer I-03. An electromagnetic coil I-02 is wound outside the thermal insulation layer I-03. A temperature sensor I-11 is arranged inside the radiation liner so as to monitor the temperature inside a heating apparatus. A supporting plate 1 I-08 and a supporting plate 2 I-10 support the heating mechanism to perform a fixing and supporting effect.

The walnut kernels are heated in a heat radiation mode. Firstly, by using the electromagnetic induction principle, eddy current is generated on the radiation liner, and then the radiation heat exchanging process of the liner and the walnut kernels is used to increase the temperature of the walnut kernels. Since the heat radiation occurs on the surface of an object, when the temperature of the red coats increases apparently, the temperature of the walnut kernels does not increase significantly.

Supposing that the temperature of the liner is homogeneous, red coat materials on the surfaces of the liner and walnut kernels can be regarded as gray bodies. The numbers of all sides of the liner are respectively 1, 2, 3 and 4, and the number of the material is 5, so $$G_5 F_5 = J_1 F_1 \varphi_{1,5} + J_2 F_2 \varphi_{2,5} + J_3 F_3 \varphi_{3,5} + J_4 F_4 \varphi_{4,5} \tag{1}$$

$$Q_5 = J_5 F_5 - G_5 F_5 = J_5 F_5 - J_1 F_1 \varphi_{1,5} - J_2 F_2 \varphi_{2,5} - J_3 F_3 \varphi_{3,5} - J_4 F_4 \varphi_{4,5} \tag{2}$$

an effective radiation expression is used to obtain $$J_5 F_5 = F_5 E_{b5} - (\frac{1}{\varepsilon}-1) Q_5 \tag{3}$$

$$J_1 F_1 + J_2 F_2 + J_3 F_3 + J_4 F_4 = F_1 E_{b1} + F_2 E_{b2} + F_3 E_{b3} + F_4 E_{b4} - (\frac{1}{\varepsilon}-1) Q \tag{4}$$

Because $Q_5 = -Q$
it can derive that $$Q_5 = \frac{F_5 E_{b5} - \varphi_{1,5} F_1 E_{b1} - \varphi_{2,5} F_2 E_{b2} - \varphi_{3,5} F_3 E_{b3} - \varphi_{4,5} F_4 E_{b4}}{\frac{1}{\varepsilon_1} + (\varphi_{1,5} + \varphi_{2,5} + \varphi_{3,5} + \varphi_{4,5})\left(\frac{1}{\varepsilon_2} - 1\right)} \tag{5}$$

Because $\varphi_{1,5} F_1 = \varphi_{5,1} F_5$
it is substituted in the above formula to obtain $$Q_5 = \frac{F_5 E_{b5} - \left(\begin{array}{l} F_1 E_{b1} \frac{F_5}{F_1}\varphi_{5,1} + F_2 E_{b2} \frac{F_5}{F_2}\varphi_{5,2} + \\ F_3 E_{b3} \frac{F_5}{F_3}\varphi_{5,3} + F_4 E_{b4} \frac{F_5}{F_4}\varphi_{5,4} \end{array}\right)}{\frac{1}{\varepsilon_1} + (\varphi_{1,5} + \varphi_{2,5} + \varphi_{3,5} + \varphi_{4,5})\left(\frac{1}{\varepsilon_2} - 1\right)} \tag{6}$$

Because 1, 2, 3 and 4 are the same material, $E_{b1} = E_{b2} = E_{b3} = E_{b4}$.

Because $\varphi_{5,1} + \varphi_{5,2} + \varphi_{5,3} + \varphi_{5,4} = 1$, $$Q_5 = \frac{F_5 E_{b5} - F_5 E_{b(1234)}}{\frac{1}{\varepsilon_1} + (\varphi_{1,5} + \varphi_{2,5} + \varphi_{3,5} + \varphi_{4,5})\left(\frac{1}{\varepsilon_2} - 1\right)} \tag{7}$$

Since the raw material on the surface of the material is not a gray body, it shall be multiplied by a correction coefficient K.

The heat flow is multiplied by time t, i.e. the heat H transferred in time t.

In the time t, the temperature increase of the unit weight is:

$$T = \frac{Kt(F_5 E_{b5} - F_5 E_{b(1234)})}{\frac{c}{\varepsilon_1} + (\varphi_{1,5} + \varphi_{2,5} + \varphi_{3,5} + \varphi_{4,5})\left(\frac{1}{\varepsilon_2} - 1\right)c} \tag{8}$$

The temperature increase of a single walnut kernel is $$T_0 = T \times m_0 \tag{9}$$

The average volume expansion coefficient is $$\beta = \frac{1}{V} \times \frac{dV}{dt} \tag{10}$$

The walnut kernels and the red coats are different in linear expansion coefficients. When the heat amount in the unit time is identical, the expansion volumes may be different, and at this time, the walnut kernels may be separated from the red coats adhered on the surfaces of the walnut kernels.

A conveyor belt has an effective heating length of α, a width of b and a heating rate of v. The mass of the walnut kernels heated in the unit area is m, and the heating efficiency of the walnut kernels is $$\alpha = \frac{m}{m_0} \tag{11}$$

In the above formulas: c—material specific heat capacity, J(kg·K); G—projection radiation force, W/m$^2$; F—area, m$^2$; φ—angular coefficient, %; J—effective radiation force, W/m$^2$; Q—heat flow, ε1—material emission rate, %; ε2—cylinder wall emission rate, %; E—radiation force, W/m$^2$; t—time, S; H—heat, J; T—temperature, °C.; m$_0$—mass of the single walnut kernel, Kg; β—average volume expansion coefficient; α—walnut kernel heating efficiency, grains/second; and v—heating rate, m/s.

The electromotive force of AC power used by the heating apparatus is set as:

$$e_1 = n_1 BS\omega \sin \omega t \tag{12}$$

Then, the induced electromotive force on the electromagnetic coil is:

$$e_2 = n_2 BS\omega \cos \omega t \tag{13}$$

The induced electromotive force generated by the eddy current is $e_3 = e_1$.

Therefore, the eddy current $$I = \frac{nBS\omega}{R} \sin \omega t \tag{14}$$

The power of the eddy current is $$P = \frac{n^2 B^2 S^2 \omega^2}{R} \sin^2 \omega t \qquad (15)$$

The heat value is $$Q = \int_0^t P\,dt \qquad (16)$$

In time t, the temperature increase is $$T = Q/c \qquad (17)$$

In the above formulas: c—liner wall specific heat capacity, J/(kg·K); e—electromotive force, V; $n_1$—number of turns of the generator coil; $n_2$—number of turns of electromagnetic coil; B—magnetic induction strength, T; S—area; ω—AC power angular frequency; I—eddy current intensity, A; P—eddy current power, W; Q—heat, J; R—liner wall resistance, Ω; t—time, S.

According to the electromagnetic heating technology (abbreviated as EH), an electromagnetic coil I-02 wound on the thermal insulation layer I-03 generates an alternating magnetic field; at this moment, the radiation liner I-07 which is made of metal is equivalent to be wrapped in the electromagnetic coil; the surface of the liner wall can be regarded as cutting the alternating magnetic lines to generate the alternating current (i.e. eddy current); the eddy current causes the high-speed irregular movement of metal atoms on the surface of the liner wall; and the atoms collide and rub with one another to generate the heat, thereby playing a role in heating the materials. The wound electromagnetic coil I-02 is characterized by being capable of uniformly and directly radiating the materials in the liner wall at 360°. Compared with the resistance heating, the electromagnetic heating is high in heat conversion rate and low in heat loss and is a heating mode with a conversion rate of 95%. Compared with the microwave heating, the electromagnetic heating does not damage the internal structure of the heated material, so that the loss of nutrients can be reduced, and no radiation harming the human body is produced. In addition, the electromagnetic heating realizes the electric isolation between a heating body and a main circuit, so that the electricity leakage phenomenon caused by the damage of the insulation can be avoided, and the safety can be greatly improved.

The size of the eddy current is related to the electric conductivity, magnetic conductivity and geometric dimension of the metal material. The eddy current consumes the electric energy. In the induction heating apparatus, the eddy current is used to heat the metal. The size of the eddy current is related to parameters such as resistivity ρ, magnetic conductivity μ and thickness h of the metal, distance δ between the metal and the coil, and exciting current angular frequency ω, etc. A calculation formula of the eddy current is as follows:

$$J = -\frac{\sigma}{2\pi r}\frac{d\Phi_m}{dt}\,(A/m^2) \qquad (18)$$

In the formula: J is eddy current, formed by magnetic flux in a circle having a radius of r, on the surface of the heating body; σ is electric conductivity of the heating body metal; and $\Phi_m$ is magnetic flux in the circle having the radius of r.

A heated body is combined with the electromagnetic induction heating coil, and a gap of 2 to 4 mm is reserved between the heated body and the electromagnetic induction heating coil. When the magnetic lines in the magnetic field pass through the liner wall, the magnetic lines are cut to generate a plurality of small eddy currents, so that the liner wall instantaneously generates heat locally. A theoretical depth of the eddy current is δ.

$$\delta = \frac{1}{2\pi}\sqrt{\frac{\rho}{\mu f}}\,(\text{mm}) \qquad (19)$$

In the formula, ρ is resistivity ($10^{-8}$Ω·mm); f is frequency (HT); μ is magnetic conductivity ($4\pi \times 10^{-7}$T/A). In actual application, according to the stipulation, the depth when I(x) is, reduced to 1/e of the surface eddy current intensity is "current penetration depth", and by calculation, the heat of 86.5 is generated in a thin layer at a depth of δ.

A metal circular plate having a thickness of h, resistivity of ρ and radius of a is disposed in a magnetic field alternating over time and having the magnetic induction intensity of B. In order to calculate the heat power, the metal circular plate is segmented into a plurality of metal thin cylinders having a width of dr, perimeter of 2πr and thickness of h along a current direction, and an induced electromotive force of any one of thin cylinders is $$\varepsilon = -\frac{d\phi}{dt} = -\pi r^2 \frac{dB}{dt} \qquad (20)$$

Resistance of the thin cylinder is $$R = \rho \frac{2\pi r}{h \cdot dr} \qquad (21)$$

Therefore, the instantaneous heat power of the thin cylinder is $$dp = \frac{\varepsilon^2}{R} = \frac{\pi h r^3 \cdot dr}{2\rho}\left(\frac{dB}{dt}\right) \qquad (22)$$

The instantaneous heat power of the eddy current of the entire metal circular plate is
supposing $B = B_0 \sin \omega t$, then $$\frac{dB}{dt} = B_0 \cos \omega t \qquad (23)$$

The average heat power of the eddy current in one period is $$\overline{p} = \frac{1}{T}\int_0^T p\,dt = \frac{\pi h a^4}{8\rho}B_0^2\omega^2 \frac{1}{T}\int_0^T \cos^2 \omega t\,dt = \frac{\pi h}{16\rho}B_0^2\omega^2 a^4 \qquad (24)$$

It can be seen from the above formula that in order to obtain large heat power output, the high-frequency alternating electromagnetic field must be selected to generate the large magnetic induction intensity, and the resistivity of the metal shall be small.

Through the theoretical analysis and by searching the data, an optimization solution is determined for the thickness of the radiation liner I-07. Supposing $$Q_{Heat\ loss} = Q_{Dissipation} + Q_{Storage} \qquad (25)$$

Then $$Q_{Heat\ loss} \approx \frac{\lambda}{s}\Delta tF + Fs\rho\Delta(Ct)\frac{1}{\tau} \qquad (26)$$

In the formula, π—heat conduction coefficient of the material, kJ/m·h·° C.
Δt—temperature difference between the radiation liner temperature and the room temperature, ° C.
S—thickness of the radiation liner, m
F—average heat dissipation area of the radiation liner, m²
ρ—volume weight of the material of the radiation liner, kg/m³
C—specific heat capacity of the material of the radiation liner, kJ/kg·° C.
τ—heating time
when $$\frac{dQ_{Heat\ loss}}{ds} = 0, \qquad (27)$$

Then $$S_{Beat} = \sqrt{\frac{\lambda \Delta t \tau}{\rho \Delta (ct)}} \qquad (28)$$

Figure 4A:
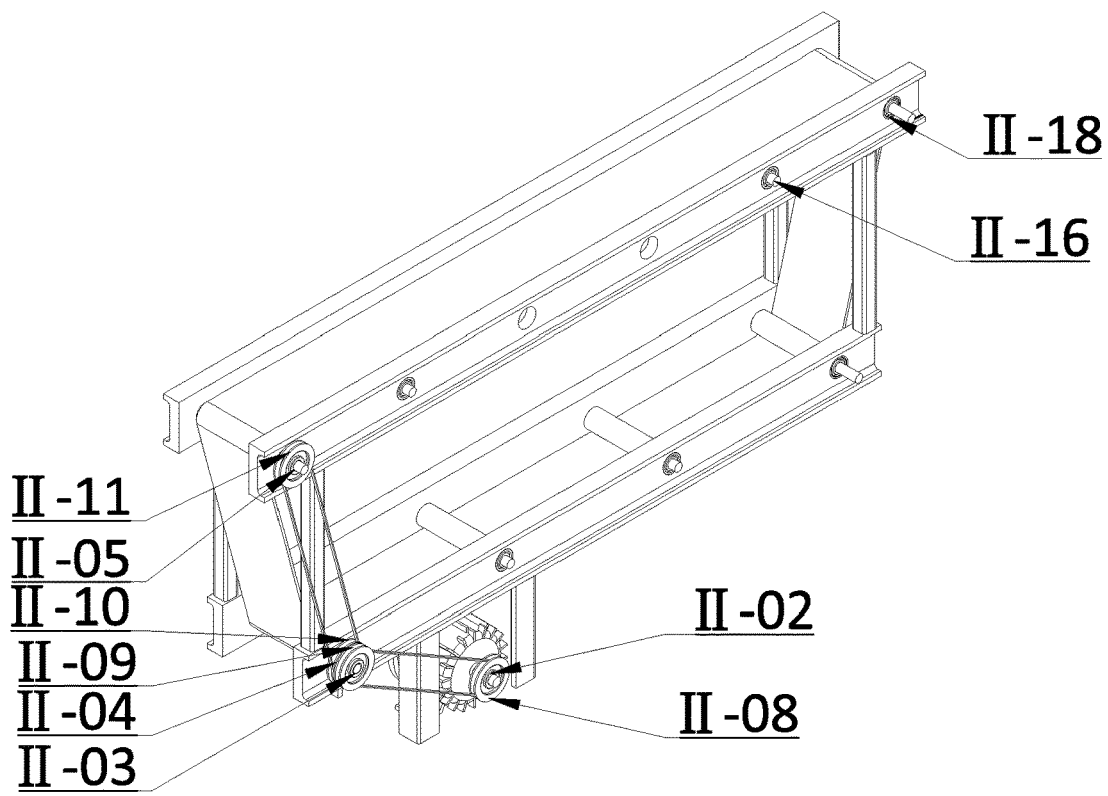
FIG. 4(*a*) is an isometric diagram of a transmission apparatus.
Figure 4B:
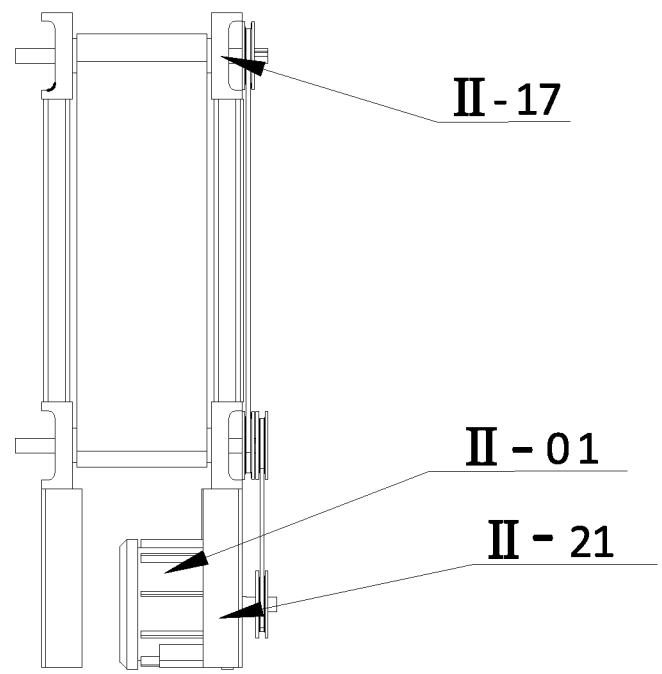
Figure 4C:
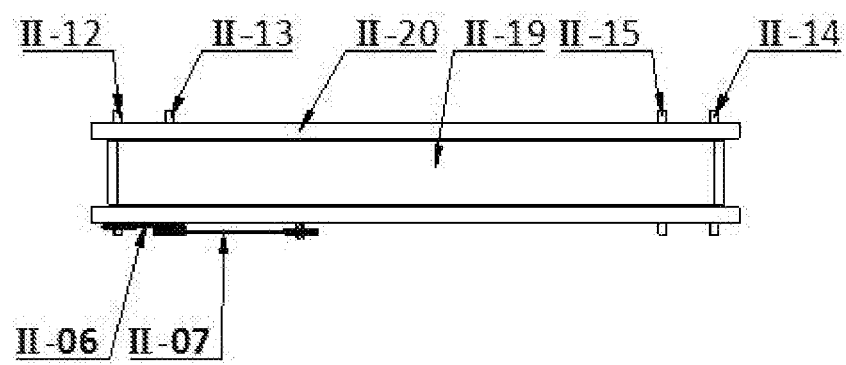

FIGS. 4(a), (b) and (c) are respectively an isometric diagram, a left view and a top view of a transfer apparatus. The transfer apparatus mainly plays a role in transferring the material, assisting the heating, and assisting the separation of impurities after the heating. The transfer apparatus may drive the materials to move in a square barrel structure. By using an electromagnetic heating technology, walnut kernels are heated by using the heat generated by angle steel on both ends of a conveyor belt II-19. After the heating is completed, since the walnut kernels and the red coats are different in heat expansion coefficients, the red coats on the surfaces of the walnut kernels are basically stripped and can be fundamentally separated in the subsequent step. A plurality of supporting shafts such as a supporting shaft 3 II-16 are fixed on one side, away from the materials, of the conveyor belt II-9 through the angle steel and are uniformly distributed to ensure the stability of the conveyor belt II-19 during the movement, so that the walnut kernels stably pass through the heating apparatus, thereby achieving a purpose of uniform heating to certain extent. A transfer shaft 1 II-12 and a transfer shaft 2 II-13 are fixed on an upper end and a lower end forming an angle with the vertical direction and having a height difference, so that the heated materials can be kept away from the conveyor belt for a certain distance when transferred downwards, thereby increasing a moving space of the walnut kernels and foreign matters, and facilitating the subsequent procedures. Power outputted by a stepper motor II-01 is transferred to a belt pulley 1 II-08 through, a key 1 II-02, a transmission belt 1 II-06 is driven by the belt pulley 1 II-08 to move, then a belt pulley 2 II-09 is driven by the conveyor belt to move to transfer the power to the belt pulley 3 II-10, a belt pulley 3 II-10 transfers the power successively to a key 2 II-03 and a key 3 II-04, and the key 3 II-04 drives the belt pulley 3 II-10 to rotate and further drives a transmission belt 2 II-07 to move. The transmission belt 2 II-07 transfers the power successively to a belt pulley 4 II-11 and a key 4 II-05, the key 4 II-05 drives a transfer shaft 2 II-13 to rotate, and the key 2 II-03 drives the transfer shaft 1 II-12 to rotate and further drives the conveyor belt II-19 to move, thereby transferring the materials. The implementation mode is less in energy consumption and high in energy utilization efficiency. The conveyor belt II-19 surrounds a supporting shaft 1 II-14, a supporting shaft 2 II-15 and a supporting shaft II-16. The conveyor belt II-19 is driven by the transfer shaft 1 and the transfer shaft 2 to move. The conveyor belt is made of stainless steel material. The walnut kernels are uniformly scattered on the conveyor belt after passing through a feeding apparatus. Meshes are uniformly formed in the belt. The stainless steel material does not generate heat in the electromagnetic heating process, so that the walnut kernels are ensured to be uniformly heated and prevented from being burned. Supporting angle steels II-20 are orderly arranged on both ends of the conveyor belt II-19. In one aspect, the supporting angle steels are connected with the supporting shaft to play a supporting role and play a role in fixing the apparatus. In another aspect, the supporting angle steels are uniformly distributed on both ends of the conveyor belt to generate heat in the electromagnetic heating process to heat the walnut kernels, so that the walnut kernels are uniformly heated. A supporting I-shaped steel II-21 is mounted at the lower end of the conveyor belt and on the periphery of a motor through the angle steel to play a role in fixing the supporting mechanism.

It is supposed that the conveyor belt has an effective heating length of a, a width of b and a transmission speed of c.

Figure 5A:
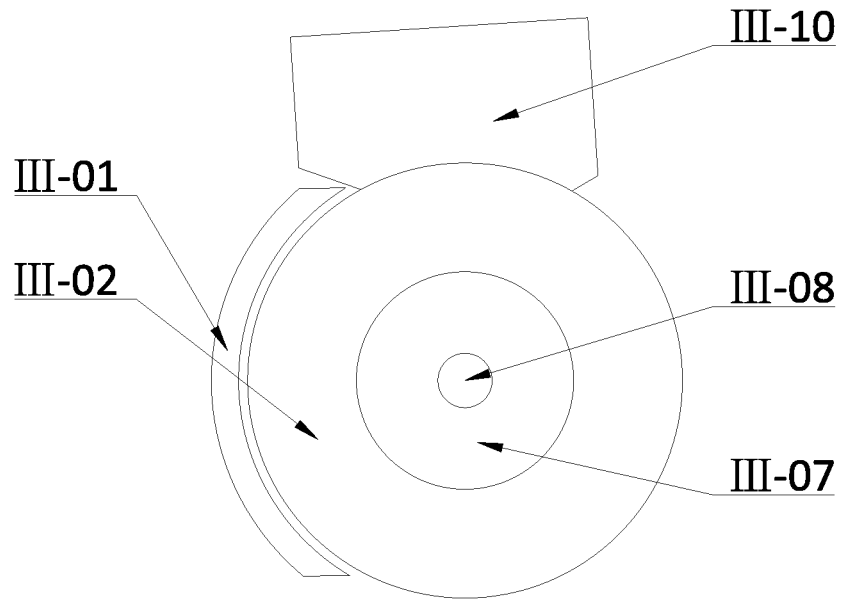
FIG. 5(*a*) is a left view of a continuous feeding mechanism.
Figure 5B:
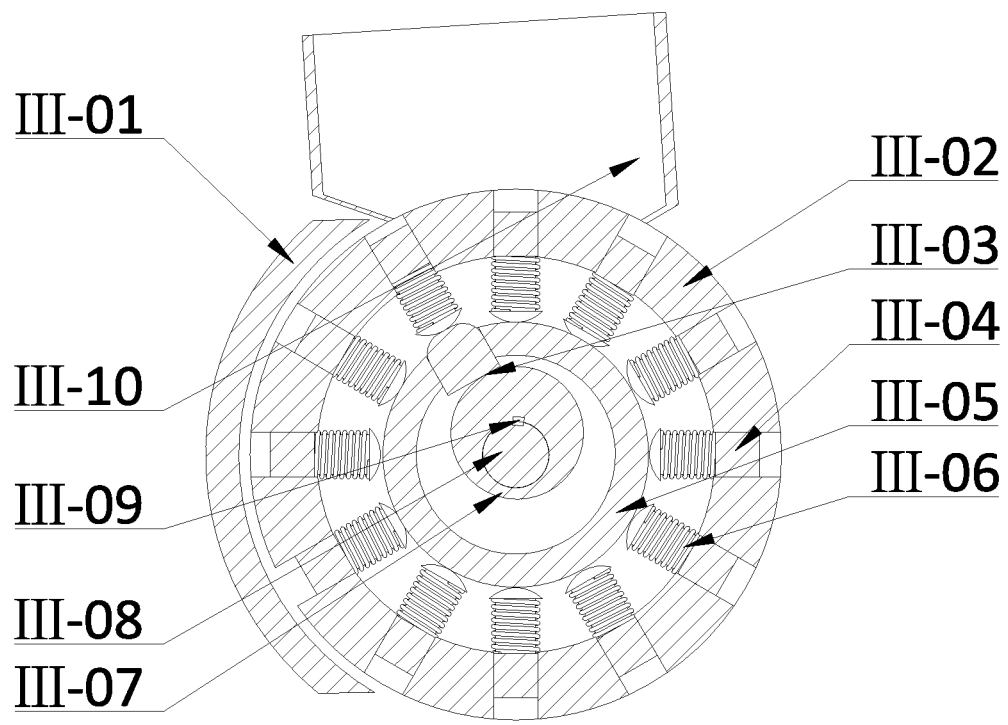
Figure 5C:
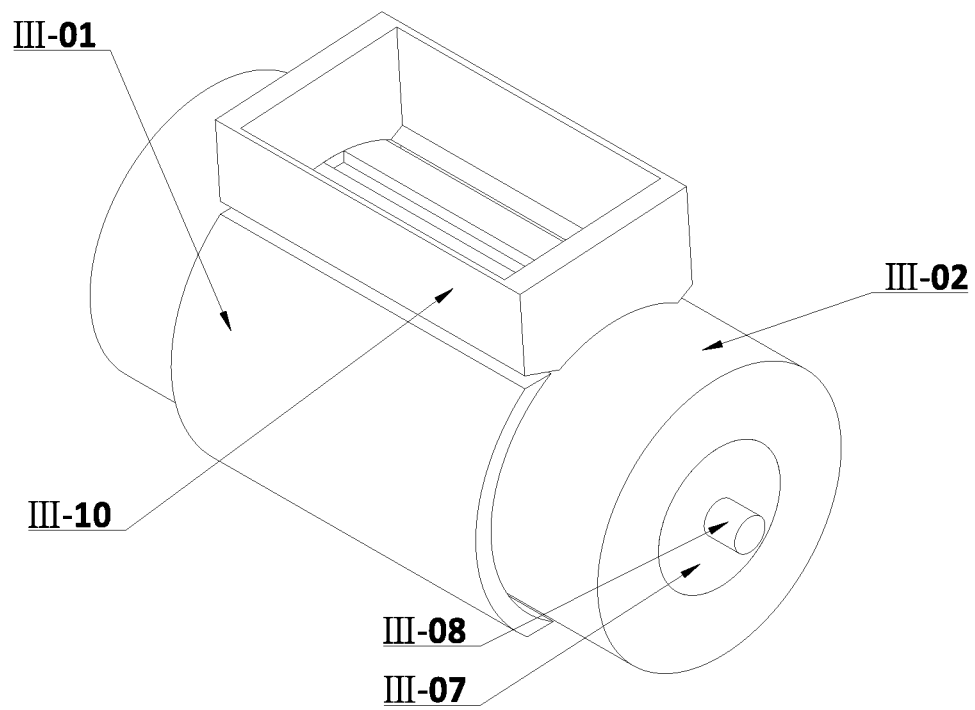

FIGS. 5(a), (b) and (c) are respectively a left view of a continuous feeding mechanism pulley, a sectional view of the continuous feeding mechanism pulley and an isometric diagram of the continuous feeding mechanism pulley. The adjustable continuous feeding mechanism pulley apparatus is an embodiment of a feeding solution. The apparatus is disposed at a feeding end of the conveyor belt II-19. A feeding box III-10 is disposed above a continuous feeding mechanism pulley III-02, so that materials in the feeding box III-10 enter a continuous feeding mechanism formed by a post pin III-04 and a continuous feeding mechanism pulley hole under the effect of gravity. Under the rotating driving of the continuous feeding mechanism pulley III-02, the materials in the continuous feeding mechanism are transported out of the feeding box III-10. For the walnut kernels, since the walnut kernels are inconsistent in size, the continuous feeding mechanism shall be designed according to a maximum size of the walnut kernel, and the walnut kernels shall be prevented from blocking in the continuous feeding mechanism. When the post pin III-04 passes through a slide block III-03 inside the continuous feeding mechanism pulley apparatus, the post pin III-04 moves outwards along the continuous feeding mechanism to push out the materials in the continuous feeding mechanism. The post pin shall be designed to be cooperated with the continuous feeding mechanism, which shall not only facilitate the reciprocating movement of a plunger and reduce the friction, but also shall prevent the small walnut kernels from blocking gaps and resulting in difficulty in cleaning. After the post pin III-04 passes through the slide block III-03, under the action of a spring III-06, the post pin III-06 is returned and forms the continuous feeding mechanism again together with the continuous feeding mechanism pulley III-02. Through the constant-speed rotation of the continuous feeding mechanism pulley III-02, the materials in the feeding box III-10 can be uniformly laid on the conveyor belt II-19. The position of the slide block III-03 can be adjusted by adjusting an eccentric sleeve III-07, so that the volume of the continuous feeding mechanism is changed, i.e. the feeding amount of the continuous feeding mechanism pulley apparatus is changed; and the eccentric sleeve is adjusted by an adjusting rotating shaft III-08, and the rotation of the adjusting rotating shaft III-08 generates a torque which is transferred to the eccentric sleeve III-07 through a key III-09, so that an adjusting effect can be achieved. When in rotation, the post pin III-04 tightly rubs against a positioning shaft sleeve III-05 under the action of the spring III-06. In order to ensure that the post pin III-04 can successfully pass through the slide block III-03 without being stuck when rotating, contact portions of the slide block III-03 and post pin III-04 are made to be in arc contact, and the friction resistance shall be reduced as far as possible. Meanwhile, the friction force between the post pin III-04 and the positioning shaft sleeve III-05 shall be minimized, which requires the elastic force of the spring to be minimized so as to reduce the pressure between the post pin III-04 and the positioning shaft sleeve III-05. The seed protection plate not only plays a role in preventing the materials brought out by the continuous feeding mechanism from splashing under the effect of a centripetal force, but also can ensure that the materials brought out by the continuous feeding mechanism can accurately and stably fall on the conveyer belt II-19, thereby playing a role in guiding the materials.

Figure 6:
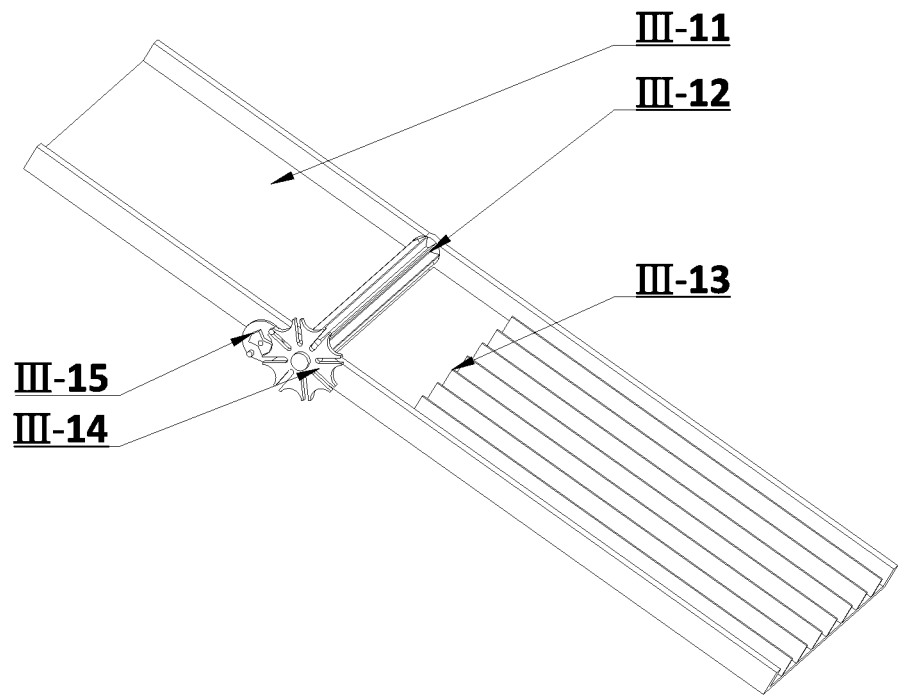
FIG. 6 is an isometric diagram of a grooved pulley.

FIG. 6 is an isometric diagram of a grooved pulley. The apparatus is another embodiment of the feeding solution and is disposed at a material inlet to uniformly convey materials onto the crawler belt. The materials are firstly placed on a feeding plate III-11. Since the feeding plate is obliquely disposed, the materials slide downwards under the effect of the gravity. When the materials are piled up in front of a distributing plate, a grooved pulley core II-15; rotates to drive a grooved pulley III-14 to rotate intermittently. When the grooved pulley III-14 rotates, a rotating plate III-12 is driven to shift and transfer the materials downwards. In a time interval when the grooved pulley III-14 stops rotating, the materials are piled up in front of the rotating plate III-12 to prepare for the rotating feeding of the grooved pulley. When the materials are shifted downwards by the rotating plate III-12, the materials are uniformly spread along an axial direction of the rotating plate III-12 and slide downwards again under the effect of the gravity. The rotating plate III-12 plays a role mainly in spreading the materials, which are not uniformly spread on the feeding plate III-11, along the axial direction of the rotating plate III-12. To prevent the pileup of the materials in the sliding process, the feeding plate is segmented by the distributing plates III-13 into a plurality of different areas along a flowing direction of the materials, so that the shifted materials enter different segmented gliding areas and fall onto the conveyor belt II-19. The main function of the apparatus is to uniformly lay the materials onto the conveyor belt II-19. By using the intermittent rotation characteristic of the grooved pulley, when the grooved pulley III-14 rotates, the materials are transported by the rotating plate III-12 onto the conveyor belt II-19. Due to the rotation of the conveyor belt II-19, when the grooved pulley rotates to feed the material at the next time, the previous materials can be just transported completely by adjusting the feeding speed of the conveyor belt II-19. Therefore, the materials can be continuously and uniformly laid on the conveyor belt II-19. An inclination angle of the whole apparatus is 45°, so as to ensure that after the rotating plate III-12 rotates for an angle, a next plate leaf is located horizontally, and the materials are ensured to fall on the plate leaf without gliding.

It should be noted that under the inspiration of the working principle of the present invention, those skilled in the art replace the electromagnetic coil with heating apparatuses in other forms, such as resistance wire heating in direct contact with the materials, which has high energy consumption, is not uniform in heating and easy to cause heat loss and may directly burn the materials without proper treatment; and microwave heating in indirect contact with the materials, which may damage the internal structure of the heated materials, increase the loss of nutrients such as grease proteins, and cause low nutrient content of the final material; and moreover, the microwave heating has radiation action, which may pose a health threat to operators to certain extent. The above heating mechanisms are simple replacements without the need of contributing creative labor and shall fall within the protection scope of the present invention. The electromagnetic heating mechanism of the present invention is an optimum solution.

By adopting the apparatus disclosed in the present invention, the walnut kernels are uniformly heated through the electromagnetic heating and the conveyor belt. The red coats and the walnut kernels are deformed to different degrees and are not tightly fitted. Through a ventilating roller mechanism, the red coats and the walnut kernels are thoroughly separated. Under the subsequent action of an air blowing roller, the stripped red coats are blown away, and only final products—walnut kernels remain. In addition, the apparatus of the present application can be used to remove coats of other materials, such as peanuts, apricot kernels and other nuts with thin coats. Therefore, the application range of the device is enlarged, and the practical value of the device is improved.

The above only describes preferred embodiments of the present application and is not intended to limit the present application. Various modifications and changes may be made to the present application by those skilled in the art. Any modification, equivalent substitution, improvement, etc. made within the spirit and principles of the present application shall be included within the protection scope of the present application.

We claim:

1. An intelligent apparatus for separating walnut kernels and red coats by belt conveying and heat radiation based on a thermal expansion and contraction principle, comprising:
an electromagnetic heating mechanism comprising a supporting frame, wherein a transfer mechanism is arranged in the supporting frame, and an electromagnetic coil is circumferentially arranged outside the supporting frame; and
the transfer mechanism penetrating through the supporting frame and used to feed walnut kernels into the supporting frame and transfer the walnut kernels out of the electromagnetic heating mechanism.

2. The intelligent apparatus for separating walnut kernels and red coats by belt conveying and heat radiation based on the thermal expansion and contraction principle according to claim 1, wherein one side of the transfer mechanism is also provided with a feeding mechanism.

3. The intelligent apparatus for separating walnut kernels and red coats by belt conveying and heat radiation based on the thermal expansion and contraction principle according to claim 2, wherein the feeding mechanism comprises a feeding plate obliquely arranged; a middle portion of the feeding plate is provided with a rotating shaft with a material shifting groove; the rotating shaft is connected with a grooved pulley component disposed on a side portion of the feeding plate; and a lower half section of the feeding plate is provided with a plurality of distributing plates;

or the distributing plates are arranged along a length direction of the feeding plate, and a longitudinal section of each distributing plate is of a herringbone structure; and the rotating shaft is arranged in a width direction of the feeding plate.

4. The intelligent apparatus for separating walnut kernels and red coats by belt conveying and heat radiation based on the thermal expansion and contraction principle according to claim 1, wherein the electromagnetic heating mechanism can be replaced by a resistance heating mechanism.

5. The intelligent apparatus for separating walnut kernels and red coats by belt conveying and heat radiation based on the thermal expansion and contraction principle according to claim 1, wherein the longitudinal section of the supporting frame is annular; both sides of the supporting frame are supported respectively through the supporting plate; a radiation liner is arranged in the supporting frame; a thermal insulation layer is arranged between the radiation liner and the electromagnetic coil;

further, the outer side of the electromagnetic coil is provided with a thermal insulation shell.

6. The intelligent apparatus for separating walnut kernels and red coats by belt conveying and heat radiation based on the thermal expansion and contraction principle according to claim 5, wherein a temperature sensor is arranged in the radiation liner; the temperature sensor is connected with a controller; and the controller is separately connected with a control switch of the electromagnetic coil and the transfer mechanism;

or, the longitudinal section of the radiation liner is arranged in a rectangular ring.

7. The intelligent apparatus for separating walnut kernels and red coats by belt conveying and heat radiation based on the thermal expansion and contraction principle according to claim 1, wherein the transfer mechanism is a conveyor belt; the conveyor belt is supported through transfer rolls arranged on an upper support rack and a lower support rack; the transfer rolls are driven by a belt transfer component to rotate; the upper support rack and the lower support rack are supported through a plurality of connecting rods; and the supporting frame is arranged around the upper support rack.

* * * * *